April 20, 1954 D. A. LANCIANI 2,676,306
WAVE GUIDE TRANSITION
Filed Sept. 6, 1950

INVENTOR
DANIEL A. LANCIANI
BY
John A. Harvey
ATTORNEY

Patented Apr. 20, 1954

2,676,306

UNITED STATES PATENT OFFICE 2,676,306

WAVE GUIDE TRANSITION

Daniel A. Lanciani, West Medford, Mass., assignor to Sylvania Electric Products Inc., a corporation of Massachusetts Application September 6, 1950, Serial No. 183,371

11 Claims. (Cl. 333—21)

The present invention relates to electromagnetic wave guide transitions and, particularly, to a transition of a type suited for intercoupling a circular wave guide operated in the $TE_{01}$ mode and a rectangular wave guide operated in the $TE_{10}$ mode.

It frequently is desirable to employ rectangular wave guides in many ultra-high-frequency radio applications. A circular wave guide operating in the $TE_{01}$ mode is, however, more efficient than the rectangular wave guide in respect to wave-signal energy loss for a given wave guide size. On the other hand, the $TE_{01}$ mode in the circular wave guide may ordinarily be difficult to handle for the reason that four other modes will also propagate in a circular wave guide just large enough to support the $TE_{01}$ mode. These other modes are the $TE_{11}$, $TM_{01}$, $TE_{21}$, and $TM_{11}$.

The present invention is related to, but is an improvement upon, the transition disclosed in the application of Richard M. Walker, Serial No. 183,352, filed concurrently herewith, and assigned to the same assignee as the present application.

It is an object of the present invention to provide a new and improved wave guide transition for intercoupling circular and rectangular wave guides for operation of the former in the $TE_{01}$ mode and the latter in the $TE_{10}$ mode while minimizing any coupling of the wave guides by undesired modes.

It is a further object of the invention to provide a novel wave guide transition which may readily employ an odd number of coupling points between a rectangular and a circular wave guide, and one which is of simple and inexpensive construction readily adaptable to mass production.

For a better understanding of the present invention, together with other and further objects thereof, reference is had to the following description taken in connection with the accompanying drawing and its scope will be pointed out in the appended claims.

Figure 1:
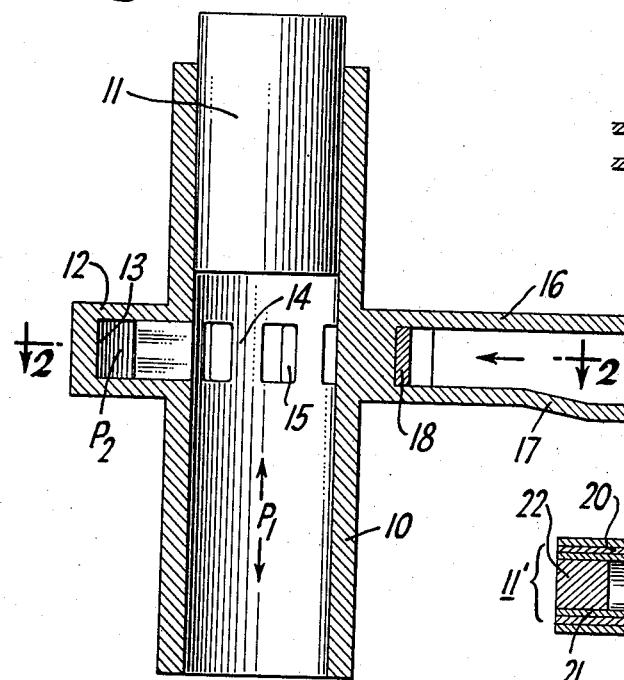
Figure 3:
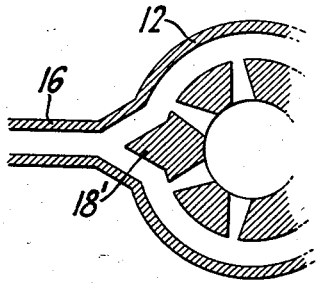
Figure 4:
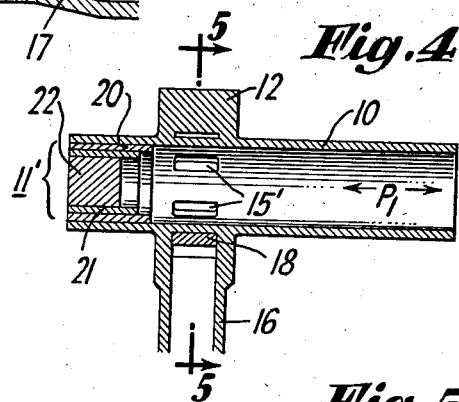
Figure 2:
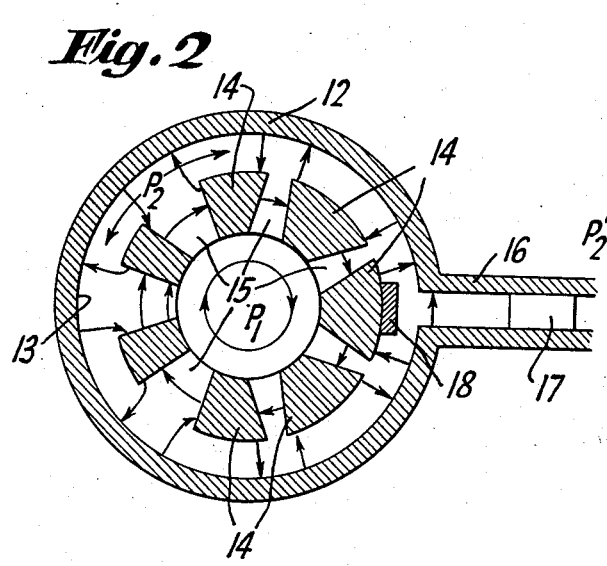
Figure 5:
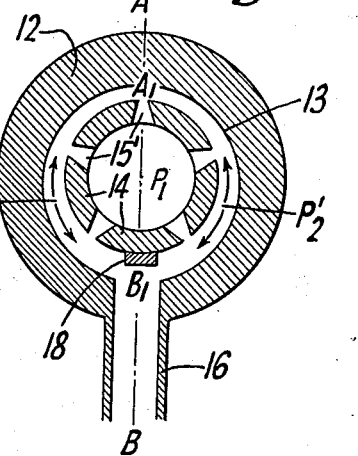

Referring now to the drawing, Fig. 1 is an elevational cross-sectional view of a wave guide transition embodying the present invention; Fig. 2 is a cross-sectional view taken along the plane 2—2 of Fig. 1; Fig. 3 is a cross sectional view of a slightly modified form of the Fig. 1 transition; Fig. 4 is a longitudinal cross-sectional view of a wave guide transition embodying a modified form of the invention; and Fig. 5 is a cross-sectional view taken along the plane 5—5 of Fig. 4.

Referring now more particularly to Figs. 1 and 2 of the drawing, the wave guide transition there shown includes a first conductive wave guide portion 10 of hollow circular cross-section providing a first wave propagation path $P_1$. The portion 10 is terminated at one end by a conductive cylindrical member 11 which may be adjustable longitudinally of the portion 10. The wave guide transition also includes a second conductive wave guide portion 12, shown integral with the portion 10, which has an inner surface 13 of cylindrical configuration with its axis coaxial with the axis of the portion 10. The portion 12 effectively provides a second wave-propagation path $P_2$ of rectangular cross-section, and one that is normal to and entirely surrounds the first path $P_1$. The two wave guide portions 10 and 12 include a conductive wall portion 14 common to the first and second propagation paths $P_1$ an $P_2$, which has a plurality of slot apertures 15 providing electromagnetic wave coupling between the paths. As will be seen from Fig. 1, the long dimension of the slots 15 is longitudinal of the wave guide portion 10 and the slots are positioned symmetrically about a plane normal to the axis of the latter. The slots are spaced around the first propagation path $P_1$ by a value equal to one wave length in the second wave propagation path $P_2$.

A third conductive wave guide portion 16 of hollow rectangular configuration provides a wave-propagation path which joins the path $P_2$ and is radial to the latter. As shown in Fig. 1, the wave guide portion 16 is reduced in depth by a sloping wall section 17 one-half wave length long to provide a conventional matching transformer used for impedance matching purposes. A metal plate 18 is positioned in opposing relation to the end of the wave guide portion 16 to match the impedance of the wave guide portion 16 to the impedance of the wave guide portion 12.

It is desirable that the conductive wall portion 14 in Fig. 2 have a wall thickness equal to a half-wave multiple (including unity) of the wave length of the energy propagated through the transition. This path constitutes an impedance transformer, and as is understood the half-wave length factor helps to suppress reflections due to inadvertent impedance discontinuities. As an impedance transformer, it constitutes an input impedance element which, with the others in a series circuit around the circular wave guide, should match the impedance of the circular wave guide. All slots are of like transverse dimension, for symmetrical excitation, at the cylindrical wave guide surface. The outer wall circumference is approximated by multiplying the wave length of the transmitted signal by the number of feeds. These are spaced one wave length apart, measured along a mean diameter of path $P_2$, as earlier mentioned. The propagation path $P_2$ has uniform cross-section along its length. The apertures 15 in the wall 14 have slot widths which successively become larger in relation to the distance of the slot from the plate 18 at the junction of the wave-propagation path $P_2$ and the wave guide 16. This equalizes the energy transfer through the slots to the circular guide. The first slots nearest plate 18 are smallest, to present a small series impedance to the further transmission along the rectangular wave guide, and the next slots are larger since the remainder of the power in the rectangular wave guide is diminished. The last slot, opposite guide 16, is fed by two parallel paths and in that case the slot width is the same as that of the preceding slots. Each transmits the same power, but, because part of the energy is delivered at each slot, the next requires greater coupling to effect the same loading.

In operation, electromagnetic wave energy propagated through the rectangular wave guide portions 12 and 16 operating in the $TE_{10}$ mode is transferred through the coupling apertures 15 to excite the circular wave guide section 10 in the $TE_{01}$ mode, or vice versa. The arrows in Fig. 2 indicate the electric-field at selected regions in the transition, and it will be seen that each aperture 15 is effectively coupled to the rectangular wave guide portion by a T junction. This explains the power division and impedance relationships earlier described. The transition embodying the present invention has the important advantage that an odd number of coupling apertures 15 may readily be used; thus if $n$ coupling apertures are employed, the only undesired modes likely to be excited are the $TE_{11}$ and $TE_{n1}$ modes which may readily be suppressed by well known means. In particular, the $TE_{11}$ mode ordinarily will not have any appreciable energy and may, if desired, be suppressed by a conventional mode filter (not shown) placed in the circular wave guide portion 10 and which may, for example, take the form of a system of radial wires. The $TE_{n1}$ mode may readily be suppressed by selecting the internal diameter of the circular wave guide portion 10 such that the latter operates below cut-off for the $TE_{n1}$ mode but operates above cut-off for the desired $TE_{01}$ mode, a condition more readily effected as the number $n$ of coupling apertures is increased.

Fig. 3 is a cross-sectional view representing a slightly modified form of the Fig. 1 arrangement wherein the junction of the wave guide portions 16 and 12 is tapered, as is the plate 18', to constitute a Y junction for more closely matching the impedance of the wave guide portion 16 to that of the portion 12. The operation of this modified form of structure is essentially similar to that described in connection with Figs. 1 and 2 and will not be repeated.

Figs. 4 and 5 represent an additional modified form of the invention which is essentially similar to that shown in Figs. 1 and 2, similar elements being identified by similar reference numerals and analogous elements by similar reference numerals primed, except that the cylindrical inner wall 13 of the wave guide portion 12 has its axis parallel to the axis of the wave guide portion 10 but displaced from the latter. It is the purpose of this structure to provide in the wave guide portion 12 two rectangular wave-propagation path portions $P_2'$ and $P_2''$ which are symmetrically positioned with respect to a plane A—B through the axis of the wave guide portion 10 and the axis of the cylindrical wall 13. As will be seen from Fig. 5, each of the wave-propagation paths $P_2'$ and $P_2''$ has a cross-section which tapers at a constant rate from the point $P_1$ to the point $A_1$. This dispenses with the need for apertures of different widths by which to equalize the power transfer through the apertures, and accordingly in the present embodiment of the invention the apertures 15' have similar configurations. The apertures are each narrowed in width, however, in the direction from the circular wave guide to the rectangular wave guide for the purpose of impedance matching. In particular, the apertures 15 are so designed that the fraction of wave-signal energy coupled through each aperture from the rectangular wave guide into the circular wave guide is equal to the reciprocal of the number of apertures.

Fig. 4 also illustrates a form of cylindrical conductive member 11' which is suitable to terminate one end of the wave guide portion 10. The member 11' effectively includes a stepped bore of dimensions selected to reduce the magnitude of any excitation in the path $P_1$ tending to cause wave-signal propagation by modes differing from the $TE_{01}$ mode desired for the wave guide portion 10. The member 11' as shown includes telescoped conductive cylindrical members 20 and 21 and a conductive plug 22. The internal diameter of the cylinder 20, and the external diameter of the cylinder 21, is selected to form a circular wave guide which will propagate the $TE_{11}$ and possibly the $TE_{n1}$ modes but which operates below cut-off for the $TE_{01}$ mode. The inner diameter of the cylinder 21, and outer diameter of the plug 22, is selected to form a circular wave guide which will propagate the $TE_{11}$ mode but which operates below cut-off for the $TE_{n1}$ mode. The cylinder 20 is adjusted along the wave guide section 10 to a position with relation to the coupling apertures 15' such that maximum transfer of power along path $P_1$ in the $TE_{01}$ mode is effected. The cylinder 21 is then adjusted in like manner to give minimum excitation in the $TE_{n1}$ mode, and the plug 22 is adjusted to give minimum excitation in the $TE_{11}$ mode. This adjustment process may be repeated several times in order to obtain the maximum suppression of the unwanted modes in a matched system. As in the Figs. 1 and 2 construction, a transition embodying the present modified form of the invention has the advantage that a large arbitrary number of coupling apertures 15' may be used not divisible by 2 or 3 so as to minimize the tendency of exciting any mode that can be propagated in the circular wave guide. The latter is chosen so that the mode corresponding to the number of slots or apertures is below the cut-off limit of the guide.

While there have been described what are at present considered to be the preferred embodiments of the invention, it will be apparent to those skilled in the art that various changes and modifications may be made therein without departing from the invention. Consequently, the appended claims should be interpreted broadly, as may be consistent with the spirit and scope of the invention.

What I claim is:

1. A wave guide transition comprising a first wave guide portion of circular cross-section providing a first wave-propagation path and a second wave guide portion of rectangular cross-section providing a second continuous wave-propagation path normal to and entirely surrounding said first path, said wave guide portions including a conductive wall which is common to said propagation paths and has a plurality of apertures located successively along said second path in the direction of energy flow therein and effecting electromagnetic wave coupling between said paths, the narrow transverse dimension of said second path and the number and dimensions of said apertures having values selected to equalize the power distribution between said first and second paths on either side of a predetermined longitudinal plane coincident with the axis of said first path.

2. A wave guide transition comprising a first wave guide portion of circular cross-section providing a first wave-propagation path and a second wave guide portion of rectangular cross-section providing a second continuous wave-propagation path normal to and entirely surrounding said first path, said wave guide portions including a conductive wall which is common to said propagation paths and has a plurality of apertures located successively along said second path in the direction of energy flow therein and effecting electromagnetic wave coupling between said paths, the narrow transverse dimension of said second path and the number and dimensions of said apertures having values selected to equalize the co-efficient of wave-signal energy coupling between said first and second path on either side of a predetermined longitudinal plane coincident with the axis of said first path and to minimize in said second path any reflection of wave-signal energy flowing therein toward each of said coupling apertures.

3. A wave guide transition comprising a first wave guide portion of circular cross-section providing a first wave-propagation path and a second wave guide portion of rectangular cross-section providing a second continuous wave-propagation path normal to and entirely surrounding said first path, said wave guide portions including a conductive wall which is common to said propagation paths and has a plurality of apertures located successively along said second path in the direction of energy flow therein and effecting electromagnetic wave coupling between said paths, the narrow transverse dimension of said second path having a value which tapers from a given value on one side of said first path to a larger value on the opposite side of said first path.

4. A wave guide transition comprising a first conductive wave guide portion of hollow circular cross-section providing a first wave-propagation path and a second conductive wave guide portion of hollow rectangular cross-section providing a second continuous wave-propagation path normal to and entirely surrounding said first path, said wave guide portions including a conductive wall which is common to said propagation paths and has a plurality of successive apertures spaced longitudinally of said second path in the direction of energy flow therein and spaced circumferentially of said first path to effect electromagnetic wave coupling between said paths, and a third wave guide portion of hollow rectangular cross-section providing a wave-propagation path communicating with said second path and radial thereto.

5. A wave guide transition comprising a first wave guide portion of circular cross-section providing a first wave-propagation path and a second wave guide portion of rectangular cross-section providing a second continuous wave-propagation path normal to and surrounding said first path, said wave guide portions including a conductive wall which is common to said propagation paths and has a plurality of successive slot apertures spaced in the direction of energy flow in said second path by a value approximately equal to one wave length in said second path with the slot length extending longitudinally of said first path to effect electromagnetic wave coupling between said paths, and a third wave guide portion of hollow rectangular cross-section providing a wave-propagation path communicating with said second path and radial thereto.

6. A wave guide transition comprising a first conductive wave guide portion of hollow circular cross-section providing a first wave-propagation path and a second conductive wave guide portion of hollow rectangular cross-section providing a second continuous wave-propagation path normal to and entirely surrounding said first path, said wave guide portions including a common conductive wall having a wall thickness equal to a substantial fraction of the wave length of wave energy propagated through said paths and said wall having a plurality of slot apertures spaced around said first path to effect electromagnetic wave coupling between said paths, each of said slots being of given length but decreasing in width through said wall in the direction from said first path to said second path, and a third wave guide portion of hollow rectangular cross-section providing a wave-propagation path communicating with said second path and radial thereto.

7. A wave guide transition comprising a first wave guide portion of circular cross-section providing a first wave-propagation path and a second wave guide portion of rectangular cross-section providing a second wave-propagation path normal to and entirely surrounding said first path, said wave guide portions including a conductive wall which is common to said propagation paths and has a plurality of apertures effecting electromagnetic wave coupling between said paths, the cross-section of said second path being uniform along the length thereof and those coupling apertures which lie on each side of a plane coincident with the axis of said first path having aperture sizes increasing between successive ones thereof in a given direction along said second path.

8. A wave guide transition comprising a first wave guide portion of circular cross-section providing a first wave-propagation path and a second wave guide portion of rectangular cross-section providing a second wave-propagation path normal to and entirely surrounding said first path, said wave guide portions including a conductive wall which is common to said propagation paths and has a plurality of apertures effecting electromagnetic wave coupling between said paths, the cross-section of said second path being uniform along the length thereof and those coupling apertures which lie on each side of a plane coincident with the axis of said first path having differing aperture sizes selected to equalize the flow of wave signal energy through said apertures between said paths.

9. A wave guide transition comprising a conductive first wave guide portion of hollow circular cross-section having a uniform wall thickness in a plane transverse its axis and providing a first wave-propagation path, a second conductive wave guide portion of hollow rectangular cross-section providing a second wave-propagation path normal to and entirely surrounding said first path, said wave guide portions including a conductive wall which is common to said propagation paths and has a plurality of apertures effecting electromagnetic wave coupling between said paths, said second wave guide portion having a cylindrical inner wall with the axis thereof parallel to but spaced from the axis of said first wave guide portion whereby said second path has two path portions lying on individual sides of and of symmetrical configuration with relation to a plane which includes each said axis.

10. A wave guide transition comprising a first wave guide portion of circular cross-section providing a first wave-propagation path and a second wave guide portion of rectangular cross-section providing a second wave-propagation path normal to and entirely surrounding said first path, said wave guide portions including a conductive wall which is common to said propagation paths and has a plurality of apertures of odd number spaced successively along said second path in the direction of energy flow therein and effecting electromagnetic wave coupling between said paths, the narrow transverse dimension of said second path and the number and dimensions of said apertures having values selected to equalize the power distribution between said first and second paths on either side of a predetermined longitudinal plane coincident with the axis of said first path.

11. A wave guide transition comprising a first conductive wave guide portion of circular cross-section providing a first wave-propagation path and a second conductive wave guide portion of rectangular cross-section providing a second continuous wave-propagation path normal to and entirely surrounding said first path, said wave guide portions including a common conductive wall having a wall thickness equal approximately to one-half of the wave length of wave energy propagated through said paths and said wall having a plurality of slot apertures spaced around said first path to effect electromagnetic wave coupling between said paths, each of said slots being of given length but decreasing in width through said wall in the direction from said first path to said second path.

References Cited in the file of this patent
UNITED STATES PATENTS

| Number | Name | Date |
|---|---|---|
| 2,462,510 | Korman | Feb. 22, 1949 |
| 2,471,021 | Bradley | May 24, 1949 |